United States Patent Office 2,712,543
Patented July 5, 1955

2,712,543
POLYIMIDE INTERMEDIATES

William F. Gresham and Marcus A. Naylor, Jr., Wilmington, Del., assignors to E. I. du Pont de Nemours and Company, Wilmington, Del., a corporation of Delaware No Drawing. Application June 11, 1954,
Serial No. 436,248

3 Claims. (Cl. 260—346.3)

This invention relates to novel organic compounds, especially diacid dianhydrides, which are useful as intermediates in the manufacture of a new class of polyimide resins.

More particularly, the invention in a specific embodiment concerns a tetraacid and dianhydride having, respectively, the formulas:

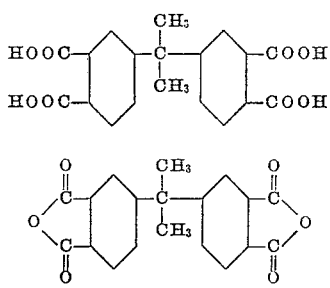

Relatively few aromatic tetracarboxylic acids or dianhydrides of aromatic tetracarboxylic acids, having all of the carboxyl groups attached directly to aromatic nuclei, have been known heretofore and, of these, none had the bridged structure similar to that of the acids and anhydrides herein disclosed.

The following examples illustrate methods of preparing this dianhydride and certain precursors thereof, particularly the diacid.

EXAMPLE 1

A. *Preparation of 2,2-bis-(3,4-dimethylphenyl) propane*

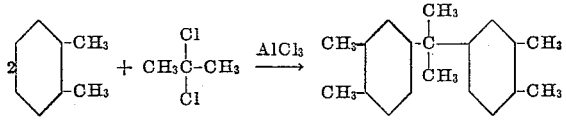

Pure o-xylene (318 grams, 3 moles) was cooled to less than 0° C. and 26 grams aluminum chloride was added. While this mixture was stirred, a mixture of 106 grams (1 mole) of o-xylene and 113 grams (1 mole) of 2,2-dichloropropane was added over a one to two hour period. The temperature was maintained at about —5° C. during this addition and for two to four hours afterward. The reaction mixture was poured into ice and allowed to come to room temperature. The organic layer was separated and washed several times with aqueous sodium hydroxide solution and several times with water. This material was dried with anhydrous magnesium sulfate and was distilled through a 24 inch Vigreux column. After the excess xylene was removed, 126–146 grams of 2,2-bis-(3,4-dimethylphenyl)-propane was collected at 140° C./1 mm. (M. P., 54.5 to 55.5° C., yield 50 to 58%). A sample of this material was recrystallized from methanol and dried at reduced pressure.

*Analysis.*—Calculated for $C_{19}H_{24}$: C, 90.4%; H, 9.58%. Found: C, 90.4, 90.5%; H, 9.8, 9.7%.

B. *Oxidation of 2,2-bis-(3,4-dimethylphenyl) propane*

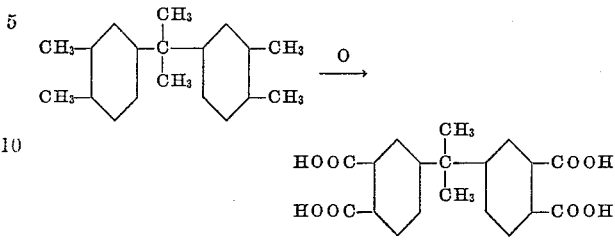

1. *Nitric acid oxidation.* The hydrocarbon, 2,2-bis-(3,4-dimethylphenyl) propane (7.56 grams, 0.03 mole), was oxidized in a shaker tube with 10% nitric acid (21.6 grams of 70% nitric acid in 130 ml. of water, 0.24 mole) at 250° C. for 20 minutes. A dark colored solid product was obtained by evaporation of the solvent at reduced pressure. The solid material was placed in a flask with xylene and the mixture was refluxed for three to four hours. During this time, some xylene and water were distilled, and the xylene was returned to the flask. Much of the solid gradually dissolved in hot xylene. The remaining hot xylene solution (about 150 ml.) was filtered, allowed to cool, and the precipitate was collected on a filter. The precipitate was recrystallized from xylene and dried in an oven at reduced pressure. The neutralization equivalent was found to be 91 (theoretical values: tetracarboxylic acid, 93; dianhydride, 84). This product was treated with acetic anhydride to insure complete anhydride formation. The acetic acid and excess acetic anhydride were distilled at atmospheric pressure through a 24 inch Vigreux column until the temperature at the head was 137° C. The remainder of the solvent was evaporated at reduced pressure and the resulting solid was recrystallized five times from xylene. A total of 3.3 grams of material was obtained in this manner from two 7.56 gram batches of the hydrocarbon.

*Analysis.*—Calculated for $C_{19}H_{12}O_6$: C, 67.87%; H, 3.60%; neutral equivalent, 84. Found: C, 69.4, 69.6%; H, 3.9, 4.1%; N, 0.06, 0.07%; neutral equivalent, 90.2.

Purification of a nitric acid oxidation product, which had been converted to the dianhydride (xylene treatment, as above described), was carried out by washing with a five per cent sodium carbonate solution to remove free acids, and by treatment with 0.1 gram of platinum oxide catalyst and hydrogen (dioxane solvent, room temperature, 60–80 p. s. i., 15 minutes) to convert nitrated products to amines. The product was washed with 10% hydrochloric acid and with water to remove the amines, and the 2,2-bis-(3,4-dicarboxyphenyl)-propane dianhydride was recrystallized from xylene.

*Analysis.*—Calculated for $C_{19}H_{12}O_6$: C, 67.87%; H, 3.60%. Found: C, 67.4, 67.2%; H, 3.7, 3.7%; N, 0%.

2. *Partial oxidation with nitric acid followed by completing the oxidation with permanganate.*—The hydrocarbon, 2,2-bis-(3,4-dimethylphenyl) propane (9.80 grams, 0.0389 mole), was oxidized in two shaker tubes with three per cent nitric acid (14 grams of 70% nitric acid and 320 ml. of water, 0.1556 mole) at 250° for 30 minutes. The tubes were washed with a five per cent sodium hydroxide solution. The basic solution was filtered and it was heated to reflux. Potassium permanganate (20.5 grams; theoretically required 25 grams) was added over a two hour period to complete the oxidation, and the solution was refluxed one hour longer. The excess permanganate was destroyed with alcohol, and the manganese dioxide was removed. The filtrate was acidified with hydrochloric acid and evaporated to dryness. This solid residue was extracted with acetone, and the acetone solution in turn was evaporated. The remaining viscous liquid was treated with xylene as above described to obtain about 2 grams of the crude 2,2-bis-(3,4-dicarboxyphenyl) propane dianhydride. Samples obtained in this manner were recrystallized from chloroform and toluene. The melting point was 185–186° C.

*Analysis.*—Calculated for $C_{19}H_{12}O_6$: C, 67.87%, H, 3.60%. Found: C, 67.3, 68.1%; H, 3.76, 4.3%.

3. *Reaction of bromine with 2,2-bis-(3,4-dimethylphenyl) propane.*—Bromine (12.7 grams, 0.0795 mole) in 50 ml. of carbon tetrachloride was added in one hour to 5 grams (0.0198 mole) of 2,2-bis-(3,4-dimethylphenyl) propane in 150 ml. of carbon tetrachloride at reflux temperature. Two fluorescent ultraviolet lamps (15 watt) were placed near the flask. When the bromine color had disappeared, the solution was evaporated to dryness, and the residue was refluxed for six hours in a solution of 20 grams of sodium hydroxide in 200 ml. of water. Since no hydrolysis appeared to have occurred, 100 ml. of ethanol was added, and the mixture was refluxed six hours longer. At the end of this time, the mixture of solid and solution was diluted to 500 ml. and acidified with hydrochloric acid. After the solvent was removed from the semi-solid material, it was washed several times with water, and a solution of 15 grams of sodium hydroxide in 150 ml. of water was added. The mixture was heated to boiling, and a total of 25 grams of potassium permanganate was added gradually. When a permanent pink color was maintained for five minutes, the excess permanganate was destroyed with ethanol, the manganese dioxide was removed by filtration, and the filtrate was acidified. The residue obtained by evaporating this solution was extracted with acetone, and the acetone was evaporated. The resulting viscous residue was treated with xylene in the above-described manner to obtain 0.2 gram of 2,2-bis-(3,4-dicarboxyphenyl) propane dianhydride (melting point, 183° C.).

4. *Oxidation with potassium permanganate in pyridine.*—Forty grams (0.159 mole) of 2,2-bis-(3,4-dimethylphenyl)-propane was dissolved in 800 ml. of pyridine, and 400 ml. of water was added. The solution was refluxed, and 100 grams (0.633 mole) of potassium permanganate was added gradually during a two hour period. The mixture was refluxed two hours more after the addition. It was filtered while hot, and the manganese dioxide was washed with pyridine and with water. The filtrate was evaporated to dryness under reduced pressure, and the residue was dissolved in 1 liter of 7% sodium hydroxide solution. The oxidation was completed by the addition of 150 grams (0.95 mole) of potassium permanganate to this boiling solution in small portions. The solution was refluxed for 30–60 minutes after the final addition. The excess permanganate was destroyed with ethanol, and the maganese dioxide was collected on a filter. The precipitate was washed with water, and the filtrates were combined, acidified, and evaporated to dryness. The solid residue was extracted with hot acetone, and the acetone solution was evaporated to dryness. The residue, which was the tetracarboxylic acid, was treated with refluxing xylene in the manner previously described to obtain dianhydride. A total of 300 grams of crude 2,2-bis-(3,4-dicarboxyphenyl) propane dianhydride was prepared in this manner and the average yield was 53 per cent. The dianhydride was purified by three recrystallizations from acetone (1 part by volume) and carbon tetrachloride (2 parts by volume); the melting point was 187 to 188° C.

*Analysis.*—Calculated for $C_{19}H_{12}O_6$: C, 67.87%; H, 3.60%. Found: C, 67.96, 67.42%; H, 2.64, 3.47%.

It is to be understood that the above-described procedures are not the only ones which can be used to prepare the tetracarboxylic acid or dianhydride of this invention. The procedures can be varied within the skill of the art, and moreover in place of the exemplified oxidation procedures the recently developed techniques for air oxidation of cycloalkanes to dibasic acids can be used, in place of the procedures herein described, for oxidation of 2,2-bis-(3,4-dimethylphenyl) propane to 2,2-bis-(3,4-dicarboxyphenyl) propane (hereinafter called PAP) and the anhydride thereof.

The dianhydride may be used as such, or converted to an ester, in the manufacture of polyimide resins. In a typical procedure the diethyl ester of PAP is obtained by adding a few drops of pyridine to an ethanol suspension of the dianhydride to facilitate rapid esterification, whereby a solution containing diester is produced. To this solution is added one molar equivalent of diamine, after which the solvent is removed by heating under diminished pressure, allowing the temperature to reach 138°. The polymerization is finally completed by heating this prepolymer in stages, under diminished pressure, suitably until a final temperature of 325° C. is reached. Products made in this manner exhibited the following properties (the diamines being tetramethylenediamine and hexamethylenediamine, respectively).

PHYSICAL PROPERTIES OF POLYIMIDES DERIVED FROM PAP DIANHYDRIDE AND DIAMINES

| Property | When Diamine Component is Tetramethylene Diamine | When Diamine Component is Hexamethylene Diamine |
| --- | --- | --- |
| Inherent viscosity (½% in m-cresol) | 1.34 | 1.67 |
| Stiffness, p. s. i., (10 mil film): | | |
| 23° C | 387,000 | 293,000 |
| 50° C | 332,000 | 263,000 |
| 75° C | 323,000 | |
| 100° C | 297,000 | 218,000 |
| Heat distortion temperature ___° C | 177 | |
| Dielectric constant (1,000 cycles) | 3.48 | 3.19 |
| Power factor (1,000 cycles) | 0.0012 | 0.0018 |
| Tensile Strength, p. s. i | 14,100 | |
| Elongation ___ percent | 10 | |
| Creep rate, mils/in. hr., 100 hrs.: | | |
| 2,000 p. s. i. stress | $1.85 \times 10^{-3}$ | |
| 3,000 p. s. i. stress | $2.8 \times 10^{-3}$ | |
| Tukon hardness, kg./mm.²: | | |
| Long diagonal | 26.4 | |
| Short diagonal | 29.4 | |
| Percent Recovery | 9.96 | |
| Water absorption, 24 hours ___ percent | 1.61 | |
| Equilibrium water absorption ___ do | 2.04 | |
| Dimensional change | None | |

The dianhydride of 2,2-bis-(3,4-dicarboxyphenyl) propane can be converted directly to polyimides by reaction with diamino alkanes especially those diaminoalkanes which have at least four carbon atoms in the chain separating the primary amino groups. Instead of the anhydride, the parent acid or esters thereof may be employed. The diamines which are most suitable include tetramethylene diamine, pentamethylene diamine, hexamethylene diamine, and diaminoalkanes having at least 4 carbon atoms separating the amino groups especially those having from 4 to 12 carbon atoms per molecule. The polymerization of trimethylene diamine with the dianhydride of 2,2-bis-(3,4-dicarboxyphenyl) propane gave a relatively low molecular weight product (inherent viscosity 0.27, as measured in ½% solution in m-cresol).

The polyamides obtained by the use of the polyimide intermediates of this invention are useful in applications requiring a low dielectric constant and low power factor together with the low rate of creep, low vibrational energy absorption, low water absorption, and good oxidative and thermal stability.

We claim:

1. A compound of the class consisting of 2,2-bis-(3,4-dicarboxyphenyl) propane and dianhydride thereof.
2. 2,2-bis-(3,4-dicarboxyphenyl) propane.
3. 2,2-bis-(3,4-dicarboxyphenyl) propane dianhydride.

(References on following page)

References Cited in the file of this patent

UNITED STATES PATENTS

| | | |
|---|---|---|
| 2,016,026 | Shinkle | Oct. 1, 1935 |
| 2,610,191 | Toland | Sept. 9, 1952 |
| 2,677,703 | Toland | May 4, 1954 |

OTHER REFERENCES

Loewenherz: Berichte, vol. 26, pp. 2486–7 (1893).
Liebermann: Berichte, vol. 45, pp. 1186–1217 (1912).
Sisido et al.: Chem. Abst., vol. 35, p. 1026 (1941).